Dec. 6, 1938.   J. W. GREIG   2,139,014
VENTILATING MEANS FOR VEHICLE BODIES
Filed Sept. 3, 1935   2 Sheets-Sheet 1
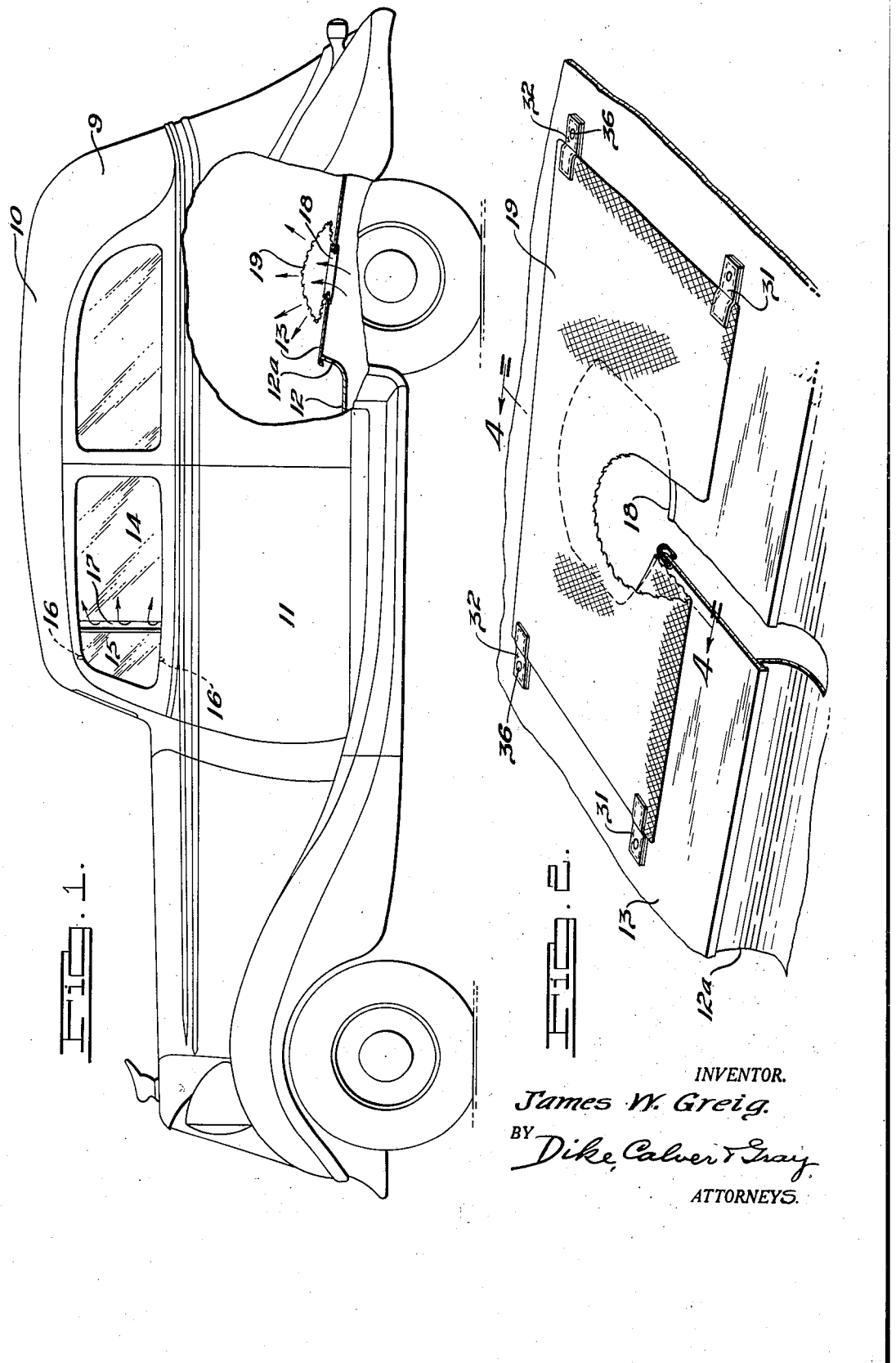
INVENTOR.
James W. Greig.
BY Dike, Calver & Gray
ATTORNEYS.

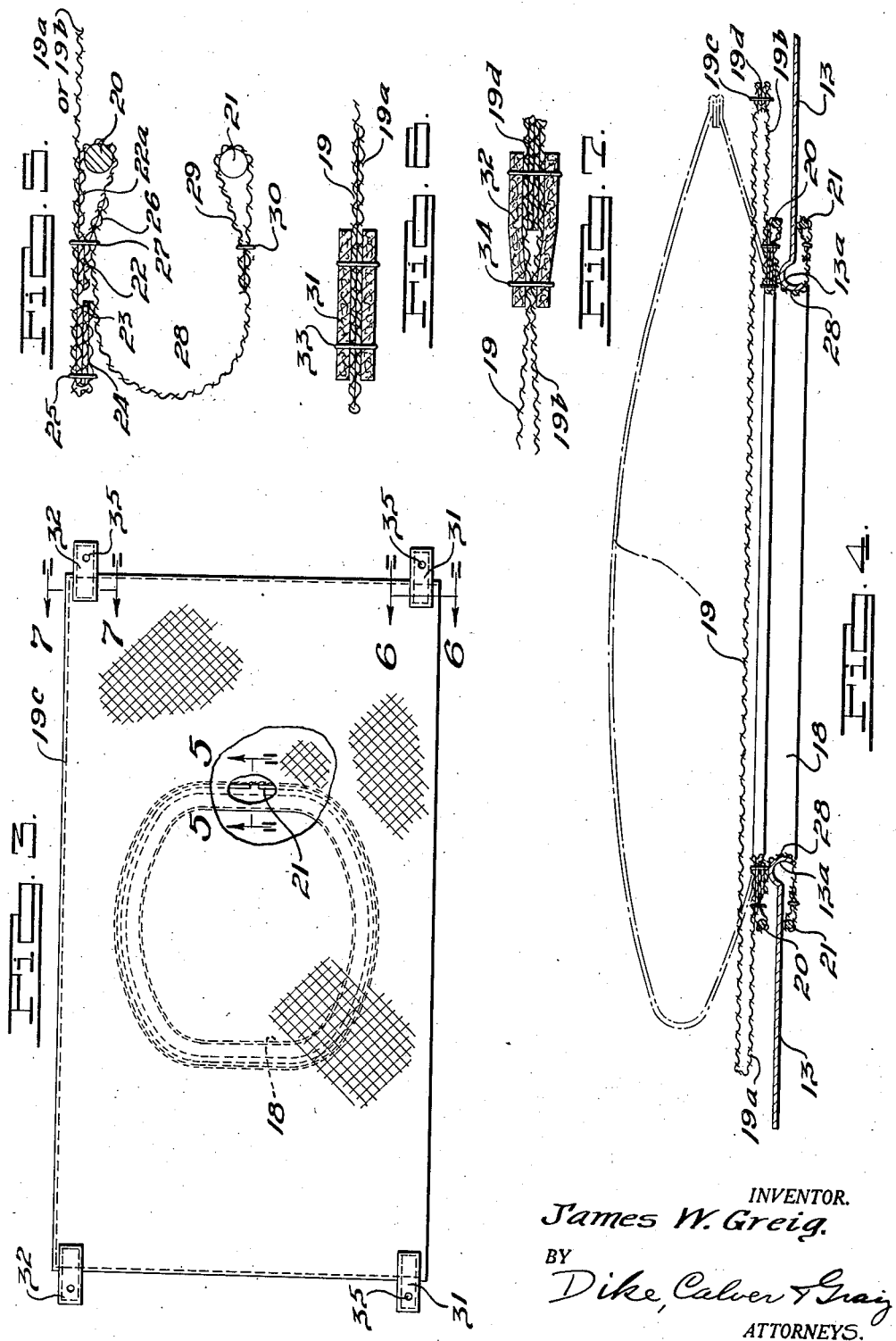

Patented Dec. 6, 1938

2,139,014

UNITED STATES PATENT OFFICE 2,139,014

VENTILATING MEANS FOR VEHICLE BODIES

James W. Greig, Grosse Pointe Park, Mich., assignor to Hudson Motor Car Company, Detroit, Mich., a corporation of Michigan Application September 3, 1935, Serial No. 38,867

6 Claims. (Cl. 98—2)

This invention relates in general to ventilating means for vehicle bodies, particularly for automobiles, and has for one of its important objects the provision of means effective to produce a desirable circulation of air and to equalize pressures between the interior and exterior of the body during travel of the car while minimizing drafts and permitting clean filtered air to be supplied to the interior of the body.

In accordance with present day systems of ventilating automobile bodies various means are provided for withdrawing or exhausting air by suction from the interior of the car. Such systems are principally dependent upon the use of pivoted windows which may be swung about a vertical axis or longitudinally sliding windows which may be shifted in the plane of the glass to produce a ventilating slot of variable size through which air is sucked during the forward travel of the vehicle. In the former system the glass is swung outwardly into the path of the air stream which is deflected to produce an external low pressure zone resulting in withdrawing air from the vehicle. In the latter system, now also widely used, the glass is slid rearwardly to produce a narrow vertical slot in rear of the outwardly jutting body pillar, which acting as a baffle or deflector in the air stream, serves to produce an exterior low pressure zone resulting in sucking air from the car.

It will be readily seen that when air is withdrawn from the vehicle body in this manner, or in accordance with any other system of suction ventilation accomplished by reason of the forward travel of the car, such air must be replaced in the body. Moreover, the efficiency of such systems of suction ventilation and the rate at which the air in the vehicle is withdrawn and hence the frequency at which the air is changed, are wholly dependent upon the rate at which the air can be replaced. It is, therefore, apparent that suction ventilators for automobiles or the like are dependent for their efficiency as well as the degree of efficiency thereof upon the means, if any, for replacing air withdrawn by the ventilators. Heretofore, when the ventilators have been in operation and the car body otherwise closed, the air has been replaced, as a matter of necessity but not as a result of any predetermined design on the part of the car builder, by seepage of air through cracks under the doors or in the floor boards or around window panes.

But with increasing attention being given in body construction to sealing cracks around door, window and windshield openings with the view to sealing the bodies more effectively against drafts in cold weather and ingress of rain or snow, it has been found that the replacement of air withdrawn through the ventilating system is materially retarded, thereby reducing the efficiency of the system. The greater part of this replacement air finds its way into the car by seepage through the floor from beneath the car. Such air, entering the vehicle through the flooring during travel of the vehicle, is laden with dust and foreign particles which is sucked in surprisingly large amounts into the car as a result of the suction created by the ventilators. In fact, the use of such ventilating systems has increased very materially the amount of impure dust-laden air entering the car.

Moreover, with the advance in body manufacture resulting in more efficient and thorough sealing up of cracks and holes around door and window openings and in the flooring, this coupled with the increasing use of all steel roofs, has resulted in greater difficulty being encountered in closing the car door when the windows are all fully closed. The slamming of the door requires considerably more effort and force under such conditions than when one or more windows are open. As a consequence the passenger often acquires a habit of slamming the door with excessive force thus incurring the danger of breaking the glass at a time when the windows are open and much less force is needed to close the door. These disadvantages are entirely overcome by the present invention wherein means is provided for equalizing pressures inside and outside of the body.

Other important objects of the present invention are (1) to provide a positive means by which air may be replaced within the car at a variable rate and so calculated as to accommodate not only the minimum but the maximum volumetric outflow induced by the ventilators under varying conditions and at any speed of the vehicle within the driving range; (2) to provide a positive medium for inflow of air as the air is sucked out of the car so that greater efficiency of the ventilators may be achieved and at the same time without producing any appreciable discomfort to passengers through drafts; and (3) to filter the air thus caused to flow into the interior of the car so as to eliminate dust, foreign matter and other impurities.

Other objects of this invention will appear in the following description and appended claims, reference being had to the accompanying drawings forming a part of this specification wherein like reference characters designate corresponding parts in the several views.

Fig. 1 is a side elevation, partly broken away, illustrating an automobile having a ventilating or pressure equalizing system in accordance with the present invention.

Fig. 2 is a fragmentary perspective view illustrating the filtered ventilating inlet beneath the rear seat of the car.

Fig. 3 is a top plan view, partly broken away, illustrating the filter for the inlet opening.

Fig. 4 is a section taken through lines 4—4 of Fig. 2 in the direction of the arrows.

Fig. 5 is a detail section taken through lines 5—5 of Fig. 3 in the direction of the arrows.

Figs. 6 and 7 are detail sections taken respectively through lines 6—6 and 7—7 of Fig. 3 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings, there has been illustrated, by way of example, one embodiment by which the invention may be carried out in an efficient and practical manner as applied to an automobile. Referring to Fig. 1, there is illustrated at 9 any suitable type of automotive vehicle having exterior metal body panels and an all-metal roof 10, front doors 11, a conventional metallic floor pan 12 terminating at 12a in a heel board adjacent the forward edge of the rear seat, and a rear seat pan 13. The usual rear seat, not shown, is disposed above the seat pan 13 and clearance spaces are provided beneath and around the seat for the inflow of air through the inlet opening of the ventilating system and its distribution within the body. One type of suction ventilator, above referred to, is illustrated by which air may be sucked or withdrawn from the interior of the car during and by reason of forward travel of the vehicle. In this instance, by way of example, each door 11 is provided with a rear vertically sliding glass panel 14 and a front glass panel or wing 15 pivoted intermediate its front and rear edges at 16 to swing about a vertical axis. It will be understood that the glass panels 14 and 15 may be closed so as to entirely close the window opening, as is understood in the art, and that the glass panel or wing 15 may be adjusted by the passenger to swing the wing outwardly into the path of the air stream to provide a variable ventilating slot 17 between the adjacent edges of the glass panels 14 and 15. The wing 15 may be adjusted so that air will not enter the vehicle to any appreciable extent and so that air will be sucked out of the car through the slots 17 as indicated by the arrows in Fig. 1.

Replacement of air withdrawn from the vehicle through the ventilating slot or slots 17 is accomplished in the present embodiment through an inlet opening 18 formed in the metallic seat pan 13 beneath the rear seat. The area of this opening is calculated so as to permit a volumetric inflow substantially equal to or at least as great as the maximum volumetric outflow through the ventilating slots 17 when the wings 15 are adjusted to positions effective to withdraw the maximum amount of air from the vehicle without any appreciable inflow past the forward edges of the wings. The inflow of air through the inlet opening 18 is induced by the suction created through the action of the ventilating wings 15 by reason of the travel of the vehicle.

The opening 18 is entirely covered by means of a filtering medium 19 which may be composed of a suitable woven fabric, such as sateen. The filter 19, as illustrated by way of example in the drawings, may comprise a blank having an area substantially greater than the opening 18. One edge of the blank is folded back upon itself at 19a along one side thereof. At the opposite side a corresponding fold is produced by means of a separate fabric section 19b having its inturned edge stitched at 19c along the inturned edge of the top blank 19, producing a four ply fold 19d. The filter material is releasably held within the opening 18 by means of a pair of circular wires or rings 20 and 21. The upper ring 20 is continuous whereas the lower ring 21 is split so that it may be compressed to a smaller diameter to pass through the opening 18 in assembling and removing the filter. The filter material 19 may be assembled with the rings 20 and 21 in any suitable manner. In the present instance the lower fold sections 19a and 19b, as shown in Fig. 5, are each folded back to provide an inturned portion 24. A section of fabric 22 is looped around the upper ring 20 and folded back at 22a along the undersurface of the fold section 19a or 19b. The part 22a is turned at 23 to provide a two-ply fold interposed between the layer 24 and the layer 19a or 19b, as illustrated in Fig. 5. A further section of fabric material 26 is placed beneath the layer 22. The layers 19a or 19b, 22a, 23 and 24 are stitched at 25 and the layers 26, 22, 23, 19a or 19b are stitched together at 27. The section of material 26 is of a width to provide a free portion 28 and is looped around the lower split ring 21 and folded in at 29, the plies being stitched together at 30. Thus, the rings 20 and 21 are anchored in the loops formed by the fabric material, as above described. It will be seen that the diameter of the upper ring 20 is substantially greater than the diameter of the inlet opening 18 so as to cause the adjacent stitched-together fold sections to overlap the flanged or coiled edges 13a of the opening, as illustrated in Fig. 4.

The filter may be assembled by compressing the lower slotted ring 21 to a small enough diameter to permit it to pass through the opening 18. When released the ring 21 will expand to the greater diameter shown in Fig. 4 and the tension thereof will draw the fabric portions 28 tightly against the curved edges 13a of the inlet opening. The design is such that expansion of the ring 21 to its full diameter will exert sufficient pull on the fabric 28 to place the ring 20 under slight tension, thereby interlocking the parts together, as shown in Fig. 4, and substantially sealing the opening against the ingress of dust or foreign particles between the filter and the edges 13a of the opening. It will be understood that the filter may be removed at any time by compressing the ring 21 to a small enough diameter to permit it to be passed upwardly through the opening 18.

In the present embodiment the four corners of the filter bag 19 are secured to the seat pan 13 by means of tabs 31 and 32 which may be of any suitable material such as leather. As illustrated in Fig. 6, the tab 31 may comprise two superimposed sections embracing the layers 19 and 19a with stitching 33 extending through the four layers. As illustrated in Fig. 7, the tab 32 may also comprise two superimposed pieces embracing both the layers 19 and 19b and the folded edges 19d thereof, the parts being secured by stitching 34. The tabs 31 and 32 may be secured to the seat pan by means of screws 36 extending through openings 35 and into tapped screw bosses in the metallic base 13.

From the foregoing it will be seen that the filter 19 together with its fold sections 19a and 19b is of bellows formation so as to expand or inflate as the inflow of air through the opening 18 increases. The tabs 31 and 32 hold the layer 19 pressed against the opening 18, and when said opening is called upon to admit a relatively small amount of air, the portion of the layer 19 immediately above the opening 18 and equal thereto in its area is sufficient to pass said small quantity of air. As the volume of the air passing through the opening 18 increases, the resistance of the fabric to the air flow causes expansion of the filter, thereby exposing the entire area of the filter to the passing air. In this manner the filtering area of the filter 19 will increase as the volume of inflowing air increases. Expanded positions of the filter are illustrated in Fig. 1 and by the dot and dash lines in Fig. 4, and as a consequence the filter will effectively accommodate both minimum and maximum volumetric inflow of air through the inlet opening and will filter out all dust and foreign matter. A preferred location of the filter opening 18 has been shown in the present embodiment as beneath the rear seat of the vehicle but it will be understood that other locations may be utilized without departing from the spirit of the invention.

I claim:

1. In an enclosed and substantially sealed vehicle body, an air inlet having its opening to the atmosphere located in the floor beneath the rear seat and out of the path of the passing air capable of producing a rise in pressure because of its impact, means for filtering the air flowing into the body through said inlet, an air outlet situated substantially at the front end of said body, means at said air outlet operating by reason of the travel of the vehicle for producing suction at said air inlet effecting the inward flow of the air into said body and suction at said air outlet effecting the outward flow of the air out of said body.

2. In an enclosed and substantially sealed vehicle body, an air inlet situated in the floor thereof beneath a seat and terminating exteriorly of the body out of the path of the impact flow of the passing air during the forward travel of the vehicle, an air filter covering said inlet, a window glass in a side wall of the body adapted to be moved into position to provide a ventilating air outlet and to create inside of said body a partial vacuum sufficient to induce solely by suction the flow of ventilating air through said body.

3. In an enclosed and substantially sealed vehicle body, an air inlet adapted to permit the flow of air into said body solely by suction, said inlet being situated beneath the rearmost seat of the vehicle, and a removable fabric air filter of bellows formation entirely covering said opening.

4. In an enclosed vehicle body, an air inlet having its opening to the atmosphere located in the floor of the vehicle beneath a seat thereof and out of the direct path of flow of the passing air during the forward travel of the vehicle, a filter covering said inlet opening, a window glass mounted in a door of the vehicle body forwardly of said inlet opening and at a point substantially higher than the same and adjustable into position to provide a ventilating air outlet and to create during the travel of the vehicle a partial vacuum within said body sufficient to induce solely by suction a unidirectional flow of air into the body through said inlet toward said outlet.

5. In an enclosed vehicle body, an air inlet having its opening to the atmosphere located in the floor of the vehicle beneath a seat thereof at a point above and in rear of the lowermost portion of the floor and out of the direct path of flow of the passing air during the forward travel of the vehicle, an inflatable and deflatable filter of bellows formation covering said inlet opening, a window glass mounted in a door of the vehicle body forwardly of said inlet opening and at a point substantially higher than the same and adjustable into position to provide a ventilating air outlet and to create during the travel of the vehicle a partial vacuum within said body sufficient to induce solely by suction a unidirectional flow of air into the body through said inlet toward said outlet.

6. In an enclosed vehicle body, an air inlet having its opening to the atmosphere in the floor beneath a seat, an inflatable filter element entirely covering said opening, and a ventilating window glass in a door of the body forwardly of said inlet opening and adjustable for exhausting air from the vehicle during its forward travel and creating an inflow of air through said inlet opening.

JAMES W. GREIG.